(12) United States Patent
Qian

(10) Patent No.: US 8,959,471 B2
(45) Date of Patent: Feb. 17, 2015

(54) INTEGRATED CIRCUIT HAVING ADAPTIVE VIA SIZING

(75) Inventor: Qi-De Qian, Santa Clara, CA (US)

(73) Assignee: Qi-De Qtan, Santa Clara, CA (US)

( * ) Notice: Subject to any disclaimer, the term of this patent is extended or adjusted under 35 U.S.C. 154(b) by 861 days.

(21) Appl. No.: 12/707,621

(22) Filed: Feb. 17, 2010

(65) Prior Publication Data
US 2010/0162194 A1 Jun. 24, 2010

Related U.S. Application Data

(63) Continuation of application No. 11/164,106, filed on Nov. 10, 2005, now Pat. No. 7,698,676.

(51) Int. Cl.
G06F 17/50 (2006.01)

(52) U.S. Cl.
CPC ........ *G06F 17/5077* (2013.01); *G06F 2217/12* (2013.01)
USPC ............................................ 716/119; 716/54

(58) Field of Classification Search
CPC .................... G06F 17/5077; G06F 2217/12
USPC .................... 716/52, 53, 54, 119, 132, 139
See application file for complete search history.

(56) References Cited

U.S. PATENT DOCUMENTS

| 6,461,877 B1 * | 10/2002 | Holloway et al. | 438/8 |
| 6,615,400 B1 * | 9/2003 | Lukanc | 716/130 |
| 2005/0076316 A1 * | 4/2005 | Pierrat et al. | 716/4 |

* cited by examiner

*Primary Examiner* — Vuthe Siek

(57) ABSTRACT

A method and system for improving the yield of integrated devices is invented by adaptively selecting contact and via sizes. According to this invention, the drawn size of via holes in a design layout is selected based on its neighboring layout geometries. The invention comprises identifying the minimal space required for placing a via; analyzing available free space for potential via size increase; identifying the proximity configuration of the via with other vias on the via layer; selecting an appropriate via size based on the free space and proximity configuration to create an improved design layout; and fabricate the new layout with model based proximity correction such that vias of a plurality of sizes are reproduced on silicon within predetermined tolerances.

20 Claims, 3 Drawing Sheets

INTEGRATED CIRCUIT HAVING ADAPTIVE VIA SIZING

CROSS REFERENCE TO RELATED APPLICATIONS

This application is a continuation of and claims priority to U.S. patent application Ser. No. 11/164,106 filed on Nov. 10, 2005 now U.S. Pat. No. 7,698,676.

The application referenced above is incorporated herein by reference in its entirety.

FIELD OF THE INVENTION

The present invention relates generally to the manufacturing of integrated devices and more particularly to methods and system for optimizing their design layout for yield improvement.

BACKGROUND OF THE INVENTION

An integrated circuit chip is fabricated according to a design layout. A typical design layout has polygonal shapes arranged in different layers, where each layer is associated with a certain step in manufacturing process. A modern integrated circuit chip has many layers comprising active devices, interconnecting conductors, and via layers. The active devices are responsible for amplification or switching while interconnect and vias are responsible for wiring the active devices together.

On an integrated circuit chip, interconnection resides in different wiring or routing layers sandwiched by layers of inter layer dielectric. Vertical electrical connections between interconnect layers are accomplished by forming via holes in the inter layer dielectric and then fill them with a conducting material. A special kind of vertical connection is the Ohmic contact, or contact in short, to the semiconductor active device. For the purpose of this disclosure, the terms contact and via are interchangeable. Both contacts and vias are represented by rectangular geometries drawn in a special contact or via layer that specify the size and position of the hole to be made on inter layer dielectric. A design layout typically has one contact layer and many via layers.

In chip manufacturing, the design layout of a via layer is first mapped to a corresponding photomasks plate. Vias holes on the wafer are formed by projecting the image of the photomask onto the wafer that is coated with photoresist. The portion of photoresist inside the via area is exposed by ultraviolet (UV) light. The exposed photoresist is dissolved in a subsequent development step, revealing the insulating material to be removed. An etch step that follows removes the insulating material inside via area and forms the actual via hole. To form the conductive path, the via hole is filled with conductive material that connects the top and bottom conductive layers. For the purpose of this disclosure, we call both contact holes and via holes as via holes.

In order to minimize the chip area, the size of via hole is made as small as possible. As the degree of integration increases, the number of vias on a chip has reached many billions. At these large numbers, even a very low failure rate can result in significant number of actual chip failures. As a result, via failure become one of the main causes for chip malfunction.

In order to improve the manufacturing yield, method such as via doubling has been employed in prior art layout. In this scheme, more than one vias is inserted to replace a single via whenever space is available. This operation is performed without generating design rule violations or increases in chip area.

Conventional via doubling inserts additional vias of the same size into the available space. This means the available space must be large enough to accommodate at least two vias plus the minimal via-to-via spacing constraints. Locations where the area is not sufficient for two vias could not benefit from this approach. In addition, the area required for placing an additional via contributes to an increase the capacitance that slows down the circuit operation. Further, it is more difficult to manufacture a pair of small, closely spaced vias using photolithography than one via with an increased area.

The concept of improving yield using an enlarged via to replace a via of minimal size was proposed by Allen et. al., where the size of a via is increased whenever there is space for it to expand without violating design rules. In theory, an expanded via would have better immunity to defects and easier to open in a lithography process.

In practice, however, using variable via and contact sizes lead to serious control problem in manufacturing. The actual contact or via sizes on the chip follows a nonlinear relationship with its drawn size. A larger contact in the drawing becomes even larger on the wafer if the minimal sized contact is to stay on target. Similarly, an increase in the dimension in one direction also causes the image to bloat in the perpendicular direction.

The reason for the non-linear relationship comes from the via size selection. In order to save chip area, via size is selected to be below the linear imaging regime where geometric optics ensures linear scaling. The size of a via hole in a layout drawing is typically smaller than the UV wavelength used for exposing the via. Although the physical size of the hole on the photomask is typically 4 to 5 times larger than the drawn value in the layout, the diffraction effect is very strong during the imaging of the contact and via holes. Under this condition, one can still control the recipe as long as only one type of hole is required.

The difference in size between the drawn and the actual wafer hole becomes even larger when we further consider the etching step in forming the hole on the inter layer dielectric. The etch rate for a bigger hole is faster as the transport of reactive species becomes less constricted as the hole gets bigger.

When vias of different drawn sizes distort in different ways due to complicated processing physics, it becomes very difficult to control the amount of overlap, or via coverage, on the bottom and the top connections for the via. Vias could become only partially covered by the top and bottom conductors, which could potentially lower the chip yield.

The second difficulty is the lack of automatic means to determine the appropriate contact or via size during layout design. Due to the large number of contact and vias, the process of deciding their size on an individual basis becomes impractical. As a result, variable via size are not used for signal connections in circuits such as random logic.

In a highly repetitive product such as the cell bank of a dynamic random access memory, flash memory, and static random access memory, a few handcrafted cells are arrayed to cover a large portion of the chip. For these special, highly repetitive products, variable contact shape have been used to reduce electrical resistance in tight spaces.

This disclosure proposes methods for the implementing variable via sizes in an integrated device containing a large number of irregularly spaced circuit elements such as random logic circuits, data path circuits, an element of field programmable gate array (FPGA), radio-frequency circuits, and most of the analog circuitry.

SUMMARY OF THE INVENTION

The present invention relates to a method for improving the yield of integrated circuits by minimizing the number of minimal sized vias. Methods are developed for expanding contacts and vias in a design layout according to their surrounding conditions and in compliance with design rule and design objective. The bounding box of a via hole on the wafer is made to match its counter part in the layout drawing by applying compensation means on the photomask.

In a preferred embodiment, vias are identified and tagged according to their functions in the circuit and their pairing conditions. A weighting factor is determined based on the type of tag and used to control the magnitude of the expansion. The layout is then analyzed to identify the free spaces. Based on this analysis, the vias are expanded into the free space without violating design rules.

In a preferred embodiment, we perform a few minor modifications to existing software packages used for via doubling. Identifying and creating free space are already performed in these tools. An additional feature of allowing a via to expand when the free space is less than that required for via doubling would implement the present invention In a preferred embodiment, the steps of identifying free space and expanding via are formulated as an engineering change order and performed under the constraint of design objective by an engineering change order tool.

In a preferred embodiment, a selected number of redundant vias are removed in order to create additional free space.

In another preferred embodiment, we further limit via sizes in the final layout to a few discrete values. This approach reduces the number of via to via neighboring combinations and makes the application of some rule based software tools more effective.

In accordance with present invention, distortion resulting from expanding a via hole is controlled by a model based optical proximity correction procedure during mask data generation. This step would match the bounding box of the via hole on the chip to the bounding box of the drawn layout.

In accordance with present invention, we insert a yield enhancement step whenever the relative positioning of the layout building blocks becomes available. In a preferred embodiment, the result after placement and route is analyzed to identify the gaps between building blocks. This form of free space is used for yield enhancement purposes where the layout building block and the vias inside are expanded to absorb the free space represented by the gap. In an alternative embodiment, we pre-characterize more than one version of building blocks, each having a different set of via sizes and area footprints. After placement and route, we select the version that has the highest yield characteristics that can still fit into the allocated space.

The method according to present invention improves the yield while taking much less space than via doubling method. Locations that could not accommodate two minimal vias and their minimal spacing can now get various degrees of improvement by enlarging the single via size. The reduction in required space also leads to smaller loading capacitance in the circuit. Further, the variable via method disclosed in this application can also work in conjunction with via doubling method.

BRIEF DESCRIPTION OF THE DRAWINGS

The invention is generally shown by way of example in the accompanying drawings in which.

Definition List 1

Figure 1:
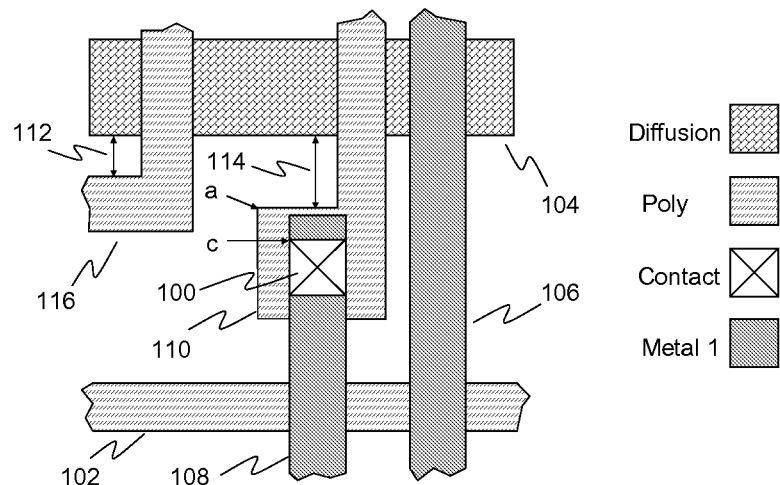
FIG. 1 is a schematic diagram showing a design layout fragment.

| Term | Definition |
| --- | --- |
| Inter Layer Dielectric | Dielectric material used to electrically separate closely spaced interconnect lines arranged in several levels (multilevel metallization) in an advanced integrated circuit. |
| Via | Hole etched in the interlayer dielectric which is then filled with metal, to provide vertical connection between stacked up interconnect metal lines or between metal and semiconductor. |
| Design rules | Minimum dimensions of devices and interconnects comprising an integrated circuit adopted during design stage; determined by the capabilities of process technology available. |
| Mask | device used to shape desired geometries on the surface of the wafer |
| Photomask | Mask used in photolithography to block resist exposure to UV radiation in selected areas; consists of chrome opaque areas supported by high quality quartz plate transparent to UV radiation. |
| Phase shifting feature | A feature on the mask made of material with desired refractive index and thickness in order to shift phase of light passing through transparent portion of the mask. A phase shift mask is a photomask having phase shifting features. |
| Subresolution assist feature | Features placed on a photomask to assist the printing of primary features. The sizes of these features are designed such that they are below the resolution limit of the lithography tool and would not appear on the wafer as distinct features. |
| Standard cell library | The standard libraries consist of a collection of logic functions that have both a logical and physical representation. |
| Design Layout | Integrated circuit layout is the representation of an integrated circuit in terms of planar geometric shapes that specify the shapes on silicon after semiconductor device fabrication. |
| Mask Layout | Mask layout is the representation of a mask in terms of planar geometric shapes. The shapes on a mask layout are generated based on the design layout such that the image it project on silicon closely resembles the design layout. Today's mask layout may include polygonal shapes that are heavily distorted from the design drawing, subresolution assist features, phase shifting features, and even additional exposure layers. |

| | Definition List 1 |
|---|---|
| Term | Definition |
| Placement and Route | Place and Route is a stage in design of integrated circutis at which a layout of a larger block of the circuit or the whole circuit is created from layouts of smaller building blocks. Due to the complexity of the task, it is usually performed in two separate stages, placement, i.e., determining the positions of the sub-blocks in the design area, and routing, i.e., interconnecting the building blocks. |
| GDSII | GDSII is binary data format for representation of planar geometric shapes, text labels and some other information in hierarchical form. |
| OASIS | Open Artwork System Interchange Standard is a specification for hierarchical integrated circuit layout data format for interchange between EDA software, IC mask writing tools and mask inspection tools. |
| CIF | Caltech Intermediate Form is a geometry language for VLSI design, in which the primitives are colored rectangles. |

DETAILED DESCRIPTION OF THE PREFERRED EMBODIMENTS

Some preferred embodiments of the present invention will be described in detail with reference to the related drawings of FIGS. 1-6. Additional embodiments, features and/or advantages of the invention will become apparent from the ensuing description or may be learned by the practice of the invention.

The methods and apparatus described here are with respect to integrated circuit manufacturing; however, the techniques described here can be applied to manufacturing or design of any device that require pattern transfer of small hole from a polygon database drawing to physical materials using lithographic and/or etch methods. Examples of these include integrated optical devices, microelectromechanical systems (MEMS), gene chips, micromachines, disk drive heads, etc.

The following description includes the best mode presently contemplated for carrying out the invention. This description is not to be taken in a limiting sense, but is made merely for describing the general principles of the invention.

We refer to geometry objects in a layout as layout objects, which could be an edge of a polygon, a polygon, or a group of polygons forming an active device. During layout design, a designer tries to pack as much functionality as possible into a given area. However, because layout objects have finite and unequal sizes, the packing of these object often leave some objects at greater than minimal distance allowed by design rules, which we define as free spaces.

After making an initial or partial layout, a designer can use the system in the present invention to improve the manufacturability of his design within the boundary of design rule and original design objective. This step, we call design for manufacturability compilation, or DFM compilation, improves the manufacturing yield of a design by reducing the number of features that could challenge manufacturing capabilities, i.e. the critical features.

An example of a critical feature is the minimal size contact and via holes, which are among the most difficult feature to manufacture by photolithography due to their small size. During photolithography, the peak intensity inside a hole is proportional to the area of the hole. A higher peak intensity allows the hole to be open more easily. Because of the area relationship and high contrast of the photoresist, a slight increase in the size of the hole brings about significant improvement to the printability, which translates to a higher probability for the hole to be opened successfully. Similar advantages also exist for other processing steps involved in conducting via formation such as etching, and filling the hole with conducting material.

An important variation of DFM compilation is to expand the size of contact and via holes such that they become easier to fabricate.

The present invention is directed to methods and system that utilize the free space for improving manufacturing yield in conjunction with reticle enhancement technology for correcting distortions, specifically, methods and system for improving the manufacturing yield of an integrated circuit by optimizing the size of contact and via holes according to their surrounding geometry.

FIG. 1 shows a design layout fragment comprising a contact hole with minimal size, 100, and its surrounding geometries. The layout fragment consists of four layers: diffusion, poly silicon, contact, and the first metal layer. Contact 100 makes a vertical connection between the first metal layer wire 108 on the upper end and polysilicon object 110 on the lower end. The square shaped portion of object 110 forms a poly contact enclosure. The spacing from the edge of the contact hole 100 to the border of the polysilicon enclosure is constrained by the minimal contact enclosure rule.

In FIG. 1 the contact feature group 100, 108, and 110 is surrounded by layout objects 102, 104, 106, and 116. These geometries are fixed in position and shape due to constraints both inside and outside of this fragment. In addition, objects 110 and 102, and objects 110 and 116 are constrained by polysilicon minimum spacing; 108 and 106 are constrained by the minimal metal spacing; therefore, nearly all objects are at minimal spacing except for the separation between the top edge of the poly contact enclosure, (a), and diffusion object, 104. This separation 114, between field poly and diffusion, is greater than the minimal separation required by the design rule, as shown in the case of separation 112. The difference between separation 114 and minimal separation 112 is the free space for contact edge (c) to expand.

Figure 2:
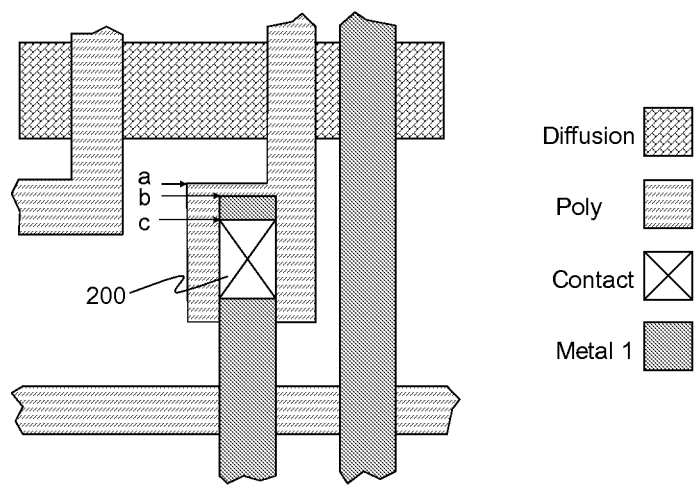
FIG. 2 is a schematic diagram showing a design layout fragment after adaptive via sizing in accordance with the present invention.

In FIG. 2, the size of contact 200 is expanded to take advantage of the free space in accordance to the present invention. In order to expand the contact hole while conforming to the design rules concerning contact enclosure for the first metal layer and polysilicon, the edges a, b, and c must be moved together, as shown in the figure.

The size of the contact hole after adaptive via sizing as demonstrated in FIG. 2 will be greater than minimal size. In a preferred embodiment, the sizing operation is performed for all four edges in the via drawing.

In a preferred embodiment, a predetermined search range is used to limit the search range to include a manageable number of polygon edges In a preferred embodiment, the magnitude of adaptive contact/via sizing is limited to a predetermined value, which may be less than the total available free space. For example, the magnitude for via size expansion is limited to one larger size other than the minimal size on one side of the via rectangle and the minimal size on the other side of said via rectangle.

In another preferred embodiment, we limit via sizes in the final layout to a few discrete values, such as one side with minimal width and another side with 1.2, 1.4, and 1.6 times the minimal width.

In a preferred embodiment, a selected number of redundant vias are removed in order to create additional free space. The selection criteria for redundant via removal comprise the amount of free space such operations can create, and potential negative influence on the electrical performance.

In a preferred embodiment, design rules that restrict contact to equal width and height with exact size must be modified to allow contact holes of greater than minimal size in the final layout. Additional design rule may be needed to constrain the distance between contact holes of a plurality of sizes. All software tools that use via related design rules must also be modified to accept greater than minimal via size.

In photolithography, when the size of a small hole is comparable or less than the wavelength, the physical size of the hole will scale non-linearly with the layout drawing. Effects such as diffraction and etching tend to produce a bigger hole on the wafer. In addition, an increasing its height always leads to certain amount of bloating in the width. The amount of bloating increases with the size of the increase in height, until the contact feature resembles a line. This unwanted feature made a variable via size on the same via layer impractical in prior art design layout In a preferred embodiment, we solve the problem of manufacturing distortion with reticle enhancement technology (RET). For example, model based optical proximity correction (OPC), controls the distortion in manufacturing by predistort the image on the photomask in an opposite direction. An OPC program adjusts the mask pattern according to a processing model such that the bounding box of the final hole on the silicon wafer matches the design layout drawings.

Figure 3:
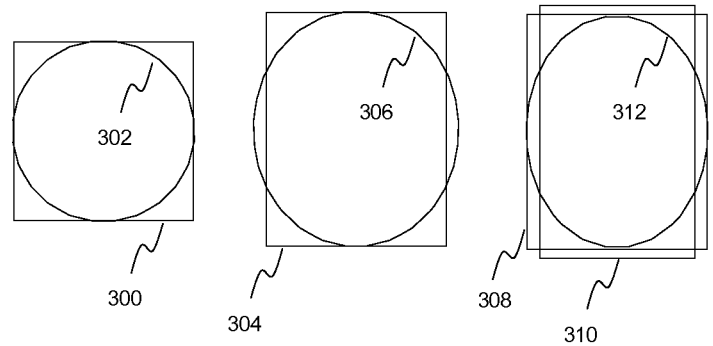
FIG. 3 is an illustration showing manufacturing distortion and the compensation method.

FIG. 3 shows the drawing of a minimal sized contact, 300, and its corresponding physical realization, i.e. the hole on the silicon wafer, 302. The manufacturing recipes are chosen such that the minimal contact produces a hole with bounding box equal to the drawing. When the hole size in the layout is increased, as drawn in 304, the image on the wafer 306 spills outside the designated hole area, causing yield problems.

In FIG. 3, we applied model based OPC to the original drawing of a via hole 308 and obtained mask pattern after OPC, 310. We use pattern 310 to build the actual pattern on the photomask, which is subsequently projected onto silicon. Because the width of the 310 is smaller than the width of 308 by an amount that compensates for the bloating, the resulting image 312, matches the bounding box of 308.

Other RET methods for compensating manufacturing distortions, such as using mask construction rules or using deconvolution of the manufacturing response functions can also be used to solve problems associated with adaptive via sizing.

Figure 4:
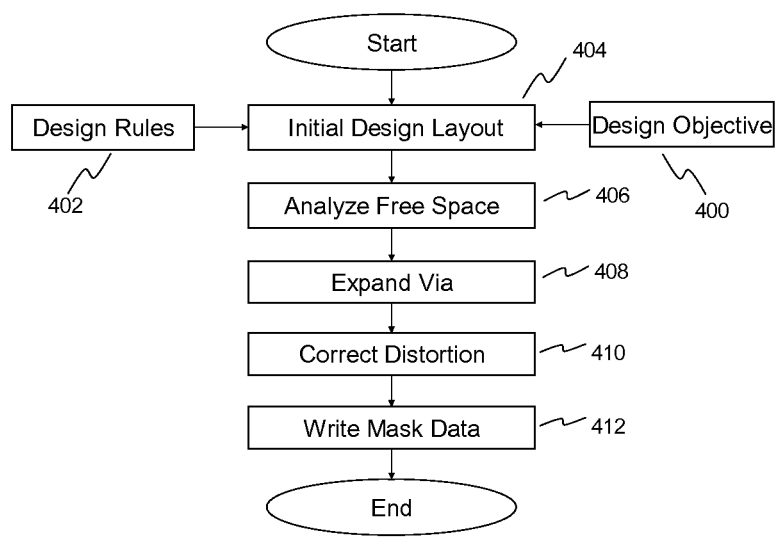
FIG. 4 is a flow/block diagram showing a method/system in accordance with the present invention.

FIG. 4 is a block/flow diagram for the present invention. Block 400 loads design objectives comprising shape and dimension of the layout boundary into the system.

Block 402 loads design rules into the system, which forms the constraint on layout polygons. In a preferred embodiment, the via size constraints comprise a minimal dimension rule which limits the minimal width and height to a predetermined value. This rule, however, does not require all vias to have the same size on a via or contact layer, nor require them to be in square shape, as in prior art design. Additional rules for limiting the minimal spacing between vias of various sizes may also be needed according to the manufacturing capabilities.

At the start of the flow, the design objective is input from 400 to 404. Design rules are input from block 402 to block 404, where an initial or partial layout is constructed using minimal contact and via size according to the design objective and the design rules. Block 404 assigns initial contact and via edge locations and their surrounding geometry.

In a preferred embodiment, an initial layout can be any layout with know contact and via positions. An initial layout can be any layout with minimal via size. In this case, a layout can be loaded from external database, in standard GDSII, CIF, OASIS or any other format. Some design objectives such as the shape and dimension of the initial layout, are embedded in said layout.

In block 406, the layout is analyzed for free spaces where we identify the area available for vias to expand without violating design rules.

In block 408, vias are expanded into the adjacent free space under the constraint of design rule and design objective. Polygons edges and/or entire polygons are moved in order to accomplish via expansion. Jogs are inserted as an option to create additional free space by reducing the granularity of layout objects.

In a preferred embodiment, vias are classified into different classes. A weighting factor is assigned to each class. The amount of expansion and priority to the free space is assigned according to the type of classification. For example, a via in a double via pair may be assigned zero weight so that no expansion operation is performed on it.

In block 410, design layout after the adaptive via sizing steps of blocks 406 and 408 is transformed into mask data. In a preferred embodiment, model based OPC is performed on the design layout in order to match the feature on silicon wafer to the drawings in the design layout. The model used for OPC includes all error sources in the pattern transfer from layout drawing to the final etched hole in the dielectric, therefore, the correction is more comprehensive than the name OPC would normally suggest. Because this invention always produces vias larger than the minimal size, a solution to OPC problem can always be found.

Block 412 writes the mask layout data to a storage medium.

In a preferred embodiment, operations in blocks 406 and 408 can be performed by existing software tools. A via doubling tool already performs the tasks of searching and creating free spaces. In this case, we can add an option to generate vias of greater than minimal size in order to implement the present invention. This will extend yield enhancement to situations where the free spaces is too small to accommodate two minimal vias plus their required separation.

In a preferred embodiment, an engineering change order (ECO) software tool is used for operations in blocks 406 and 408, such as SiFix and other SiClone family of software program from Sagantec, or Virtuoso Layout Migrate from Cadence Design Systems. Via expansion is formulated as an ECO that requires all via sizes on a via layer to be increased to a predetermined size that is larger than the minimum. If the layout is densely packed and layout size is not allowed to change, such operation would yield a partial solution. This is still acceptable as long as we also limit the smallest via size in the solution to the design rule minimum. Locations where the new and larger via width cannot be reached are typically flagged by an ECO tool. These locations can be further improved with a manual layout editing step.

Figure 5:
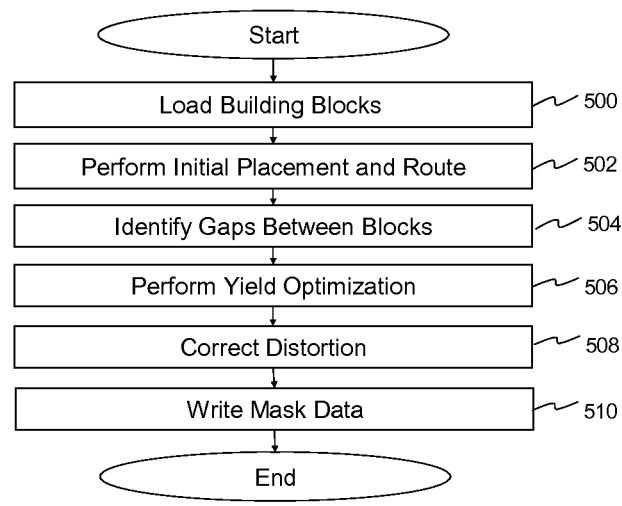
FIG. 5 is a flow/block diagram showing a method/system for yield enhancement.

FIG. 5 is a flow/block diagram for implementing adaptive via sizing in a design environment. Modern layout design is performed in stages. In the first stage, the drawing of circuit building blocks is performed. Each block performs a predetermined function. It is referred to as a functional block or intellectual property (IP) block. The functional blocks comprise standard cell libraries, memory, input/output circuitry, etc. These IP blocks are licensed in commercial market as products. At a later stage, these functional blocks are put together with placement and route software to form an entire system on chip (SOC).

In FIG. 5, block 500 loads pre-designed functional IP blocks into the system. In a preferred embodiment, we apply the flow described in FIG. 4 to the IP blocks such that the yield of these IP products is superior to their counter part with uniform minimal contact size.

Block 502 performs the placement and route procedure. In a preferred embodiment, the router analyses the areas available for making vias and inserts vias of appropriate size in accordance with present invention. This procedure is essentially the same as the via doubling procedure already existing in routing products in terms of the internal software algorithm. In a preferred embodiment, an option for users to select one or more vias of greater than minimal size is added along with the capability to create such structure by the computer.

The solution for placement and route can leave gaps between placed blocks. Block 504 identifies the gaps between building blocks created by placement and route step and passes the information to block 506.

In block 506, via expansion is performed on the building blocks adjacent to the gaps. In this case, the entire layout area can expand into the gap, which is a special form of free space, resulting in more yield improvement than similar operation under fixed area constraints.

In a preferred embodiment, multiple versions of building blocks of equivalent electrical property but different layout size, via size, and yield characteristics are made available in a library. Each version in the library is precharacterized for their electrical properties so that they can be incorporated into a bigger circuit without further evaluation. Block 506 provides the means for picking the appropriate version based on the free space information.

Block 508 performs the task of correcting for manufacturing distortion. This step is similar to that in block 410 in FIG. 4.

Block 510 writes the mask layout data to a storage medium.

Figure 6:
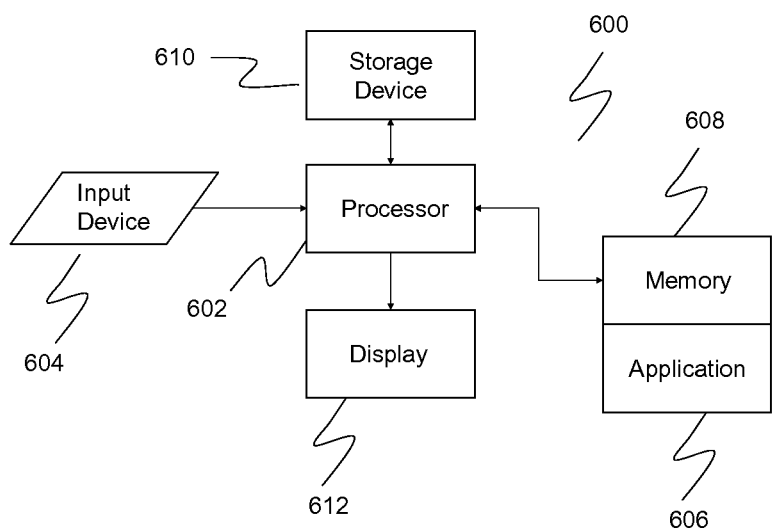
FIG. 6 is a block diagram showing a system for implementing the present invention.

FIG. 6 illustrates a representative digital computer system 600 that can be programmed to perform the method of this invention.

Referring to FIG. 6, system 600 includes a processor 602 that accesses memory device 608 and storage device 610. Memory device 608 stores an application software package 606 for implementing the present invention. Storage device 610 stores layout, operation recipes, design objectives, and design rules on one or more storage media. A user interfaces with the processor 602 through an input device, 604, which may include a keyboard, a mouse, a touch screen monitor, a voice recognition system or other known input devices. A display 612 is also included to display results, prompts, user inputs, graphics, etc.

Other digital computer system configurations can also be employed to perform the method of this invention, and to the extent that a particular system configuration is capable of performing the method of this invention, it is equivalent to the representative digital computer system of FIG. 6, and within the scope and spirit of this invention.

Once they are programmed to perform particular functions pursuant to instructions from program software that implements the method of this invention, such digital computer systems in effect become special-purpose computers particular to the method of this invention. The techniques necessary for this are well-known to those skilled in the art of computer systems.

Computer programs implementing the method of this invention will commonly be distributed to users on a distribution medium such as floppy disk or CD-ROM. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The term "computer-readable medium" encompasses distribution media, intermediate storage media, execution memory of a computer, and any other medium or device capable of storing for later reading by a computer a computer program implementing the method of this invention.

While the present invention has been described in detail concerning the preferred embodiments, it should be appreciated that various modifications and variations may be made in the present invention without departing from the scope or spirit of the invention. In this regard, it is important to note that practicing the invention is not limited to the applications described hereinabove. Many other applications and/or alterations may be utilized if such other applications and/or alterations do not depart from the intended purpose of the present invention.

It should further be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as such modifications, embodiments and variations come within the scope of the appended claims and their equivalents.

What is claimed is:

1. An integrated circuit product comprising:
   a plurality of essentially irregularly placed active devices;
   one or more metal layers comprising metal lines;
   one or more dielectric layers insulating between said metal layers and said active devices;
   a first plurality of single via structures having a first predetermined hole size associated with a first via hole size in a design layout in one or more said dielectric layers; and
   a second plurality of single via structures comprising distortion corrected via holes having one or more hole sizes larger than said first predetermined hole size in at least one of said one or more said dielectric layers;
   wherein said second plurality of single via structures have via hole sizes essentially matching one or more predetermined sizes associated with one or more via hole sizes larger than said first hole size in said design layout;
   wherein said first plurality of single via structures and said second plurality of single via structures connect said metal lines and said active devices through said dielectric layers.

2. The integrated circuit product of claim 1, wherein said second plurality of single via structures functionally connect said active devices to form a logic circuit.

3. The integrated circuit product of claim 1, wherein said first plurality of single via structures has essentially circular shaped via holes with a predetermined diameter; and said second plurality of single via structures comprises vias having oval shaped via holes with widths in said ovals' narrow direction approximately equal to said diameter and lengths in said ovals' wide direction less than twice of said diameter.

4. The integrated circuit product of claim 1, wherein said second plurality of single via structures consists essentially of vias having via hole sizes smaller than approximately four times the value of said first predetermined hole size.

5. The integrated circuit device of claim 1, wherein said first predetermined hole size comprises dimensions less than approximately an exposure wavelength of photolithography apparatus for fabricating said via holes.

6. The integrated circuit product of claim 1, wherein said predetermined sizes have width dimensions substantially equal to the width dimensions of said associated via holes in said design layout.

7. The integrated circuit product of claim 1, wherein said second plurality of single via structures comprises via holes having photomask patterns designed to correct for distortions introduced by one or more patterning apparatus for fabricating said via holes.

8. The integrated circuit product of claim 1, wherein both said via holes in said first plurality of single via structures and said via holes in said second plurality of single via structures are in essentially random proximity with one another in said one or more said dielectric layers.

9. The integrated circuit product of claim 1, wherein said second plurality of single via structures comprises via holes have shapes selected from a group consisting of: essentially circular, essentially non-circular oval, square with rounded corners, rectangle with rounded corners, and their combinations thereof.

10. The integrated circuit product of claim 1, wherein said first plurality of single via structures has essentially circular shaped via holes with a predetermined diameter; and said second plurality of single via structures comprises vias having oval shaped via holes with widths in said ovals' narrow direction approximately equal to said diameter and lengths in said ovals' wide direction larger than said diameter.

11. An integrated circuit product comprising:
a plurality of conductors residing in a plurality of layers;
one or more insulating layers separating said conductors;
a plurality of single via structures with via holes having two or more predetermined sizes associated with vias having two or more hole sizes in corresponding design layout of at least one of said insulating layers;
wherein said single via structures connect said conductors through at least one of said insulating layers at essentially irregular intervals;
wherein said via holes have photomask patterns designed to correct for distortions introduced by fabrication apparatus for said via holes.

12. The integrated circuit product of claim 11, wherein said predetermined sizes have width dimensions substantially equal to the width dimensions of said via holes in said corresponding design layout.

13. The integrated circuit product of claim 11, wherein said predetermined sizes have width dimensions along said via holes' narrow direction less than approximately an exposure wavelength of photolithography apparatus for fabricating said via holes.

14. The integrated circuit product of claim 11, wherein said via holes have shapes selected from a group consisting of: essentially circular, essentially non-circular oval, square with rounded corners, rectangle with rounded corners, and their combinations thereof.

15. An integrated circuit product comprising:
a plurality of conductors residing in a plurality of layers;
one or more insulating layers separating said conductors;
a plurality of single via structures having essentially non-circular oval shaped via holes contacting one or more said conductors through at least one of said one or more insulating layers at essentially irregularly spaced intervals;
wherein said essentially non-circular oval shaped via holes are fabricated by a process comprising a step for correcting distortions introduced by one or more patterning apparatus for said via holes, such that length and width dimensions of said via holes are substantially equal to predetermined target length and width dimensions associated with length and width dimensions of said via holes in design layout.

16. The integrated circuit product of claim 15, wherein said oval shaped via holes have dimensions along said ovals' narrow direction less than approximately an exposure wavelength of photolithography apparatus for fabricating said via holes.

17. The integrated circuit product of claim 15, wherein said oval shaped via holes have length dimensions in said ovals' wide direction less than approximately twice of the width dimensions in said ovals' narrow direction.

18. The integrated circuit product of claim 15, wherein said oval shaped via holes have width dimensions along said ovals' narrow direction approximately equal to the dimension of said via holes in design layout measured along the same direction.

19. The integrated circuit product of claim 15, further comprising a plurality of single via structures having essentially circular shaped via holes contacting one or more said conductors through said at least one of said one or more insulating layers at essentially irregularly spaced intervals.

20. The integrated circuit product of claim 19, wherein said essentially circular shaped via holes have diameters approximately equal to the width dimensions of said oval shaped via holes measured along said ovals' narrow direction.

* * * * *